UNITED STATES PATENT OFFICE.

LEWIS FRANCIS AND CYRUS H. LOUTREL, OF NEW YORK, N. Y., ASSIGNEES OF L. FRANCIS AND F. W. LETMATE, OF SAME PLACE.

IMPROVED COMPOSITION OF MATTER.

Specification forming part of Letters Patent No. 35,149, dated May 6, 1862; Reissue No. 1,867, dated February 28, 1865.

*To all whom it may concern:*

Be it known that LEWIS FRANCIS and FREDERICK W. LETMATE, of the city, county, and State of New York, have invented, made, and applied to use a new and useful Composition of Matter; and we do declare the following to be a full, clear, and correct description of the same, reference being had to the accompanying specimens.

The nature of this invention consists in combining glue, glycerine, and castor-oil, or any of the "fixed" oils, to form a new and useful composition of matter for various purposes.

In making this improved composition we combine glue, glycerine, and castor-oil, or any of the fixed oils employed, in about the following proportions, namely: glue, two (2) pounds; glycerine, four (4) pounds; castor-oil, or any of the fixed oils, one (1) pound. The glue employed is first soaked in water for about five minutes, in order that it, (the glue,) when added to the glycerine, may be thoroughly incorporated with the same, which otherwise would not result, as glycerine will not dissolve glue. The glycerine is placed in a steam-kettle and heated to a temperature of about 200° Fahrenheit, and the glue is added gradually to the glycerine, the latter being kept well stirred until all the glue has been added and thoroughly incorporated with the glycerine. The castor-oil, or any of the fixed oils employed, is now added, and when it has been well mixed with the glue and glycerine the composition may be cast into thin sheets or cakes of any desired form, ready as an article of commerce. The sheets or cakes are exposed to the air for several days, in order that any moisture remaining in the composition may be thoroughly evaporated; or a vacuum-pan may be employed for this purpose. By this last process all liability of the composition to shrink from the presence of water or moisture is obviated. The composition is then ready for sale or for remelting and casting into any desired form, and can be recast from time to time.

The improved composition thus made will be found particularly applicable to the manufacture of a superior article of printers' inking-rollers, also for various purposes where elasticity is required, for the taking of impressions in various ways, for the formation of molds and casts, and various other purposes.

We do not wish to be understood as intending to confine ourselves to the use or employment of the ingredients herein stated in the proportions set forth, as we are well aware that these proportions may in some cases be advantageously varied. Neither do we intend confining ourselves exclusively to glue, as other gelatines may be substituted for glue, and various gums, resins, and bitumen may be employed in part, and the composition thereby improved for some purposes, care being taken that when any one of the gums, resins, or bitumen is employed the same is first dissolved by its proper solvent before being added in the manufacture of the composition.

Having thus described the invention, what we claim as new, and desire to secure by Letters Patent, is—

Combining glue, glycerine, and castor-oil, or any of the fixed oils, to form a new and useful composition of matter for various purposes.

LEWIS FRANCIS.
CYRUS H. LOUTREL.

In presence of—
A. SIDNEY DOANE,
W. D. EVERIT.